United States Patent Office 3,388,323
Patented June 11, 1968

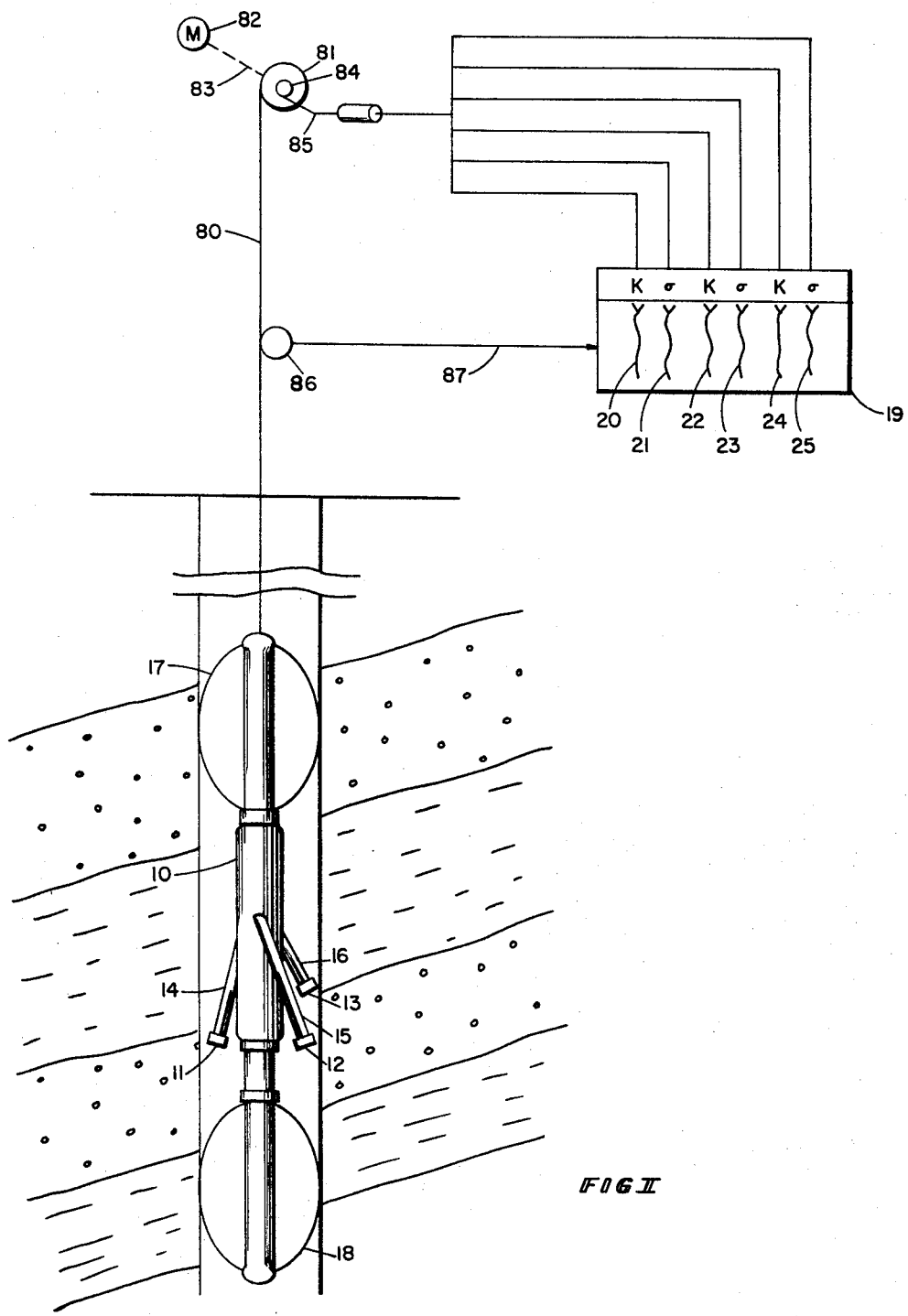
FIG I

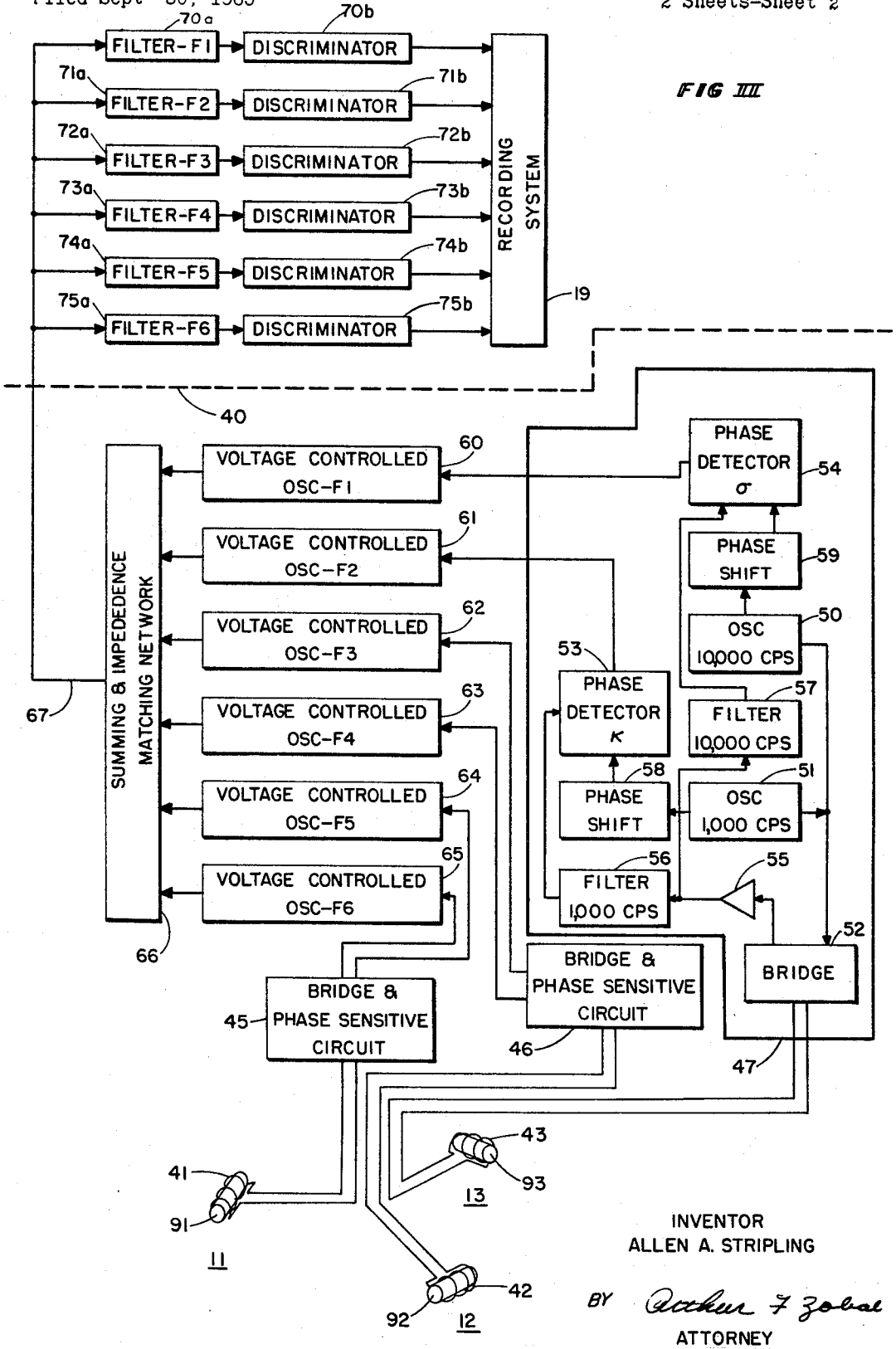
FIG III

3,388,323
BOREHOLE SYSTEM INCLUDING THREE ANGULARLY SPACED COIL MEANS FOR MEASURING SUBSURFACE DIP
Allen A. Stripling, Dallas, Tex., assignor to Mobil Oil Corporation, a corporation of New York
Filed Sept. 30, 1965, Ser. No. 491,779
1 Claim. (Cl. 324—8)

ABSTRACT OF THE DISCLOSURE

The specification describes a borehole logging technique and system for determining subsurface dip from two independent parameters indicative of magnetic susceptibility and electrical conductivity or resistivity, both derived from magnetic field measurements carried out at three angular positions adjacent the borehole walls. In the embodiment disclosed, three coils are employed for carrying out the borehole measurements. These coils are energized to generate magnetic fields at three angular regions around the borehole wall and the outputs thereof are phase separated into magnetic susceptibility and resistivity measurements.

---

This invention relates to the determination of subsurface dip from induction measurements carried out in a borehole and more particularly to a system for obtaining dip information by simultaneously measuring at least two independent parameters representative of magnetic susceptibility and electrical conductivity, respectively, recorded and displayed as a function of the position of a measuring means along the borehole.

Conventional borehole dipmeter systems generally employ three sensing devices spaced 120° apart in a plane perpendicular to the borehole axis for obtaining three measurements, each representative of a single parameter sensed by the corresponding sensor. For example, one well-known type of dipmeter system employs electrodes for the sensors for obtaining measurements of electrical resistivity. Dipmeter systems of this type have disadvantages in that certain formations may show no appreciable change in the single parameter being measured, when in fact changes in the material composition may occur. Thus, important dip information may not be recorded. Moreover, an electrode system of the type mentioned has disadvantages since it requires the borehole fluid to be conductive and hence cannot be used satisfactorily in boreholes drilled with oil-based drilling fluids or in air- or gas-filled holes.

In accordance with the present invention, a novel system is provided for determining dip from two types of measurements representative of independent parameters obtained from sensing operations carried out in a borehole from each of a plurality of angular positions at each depth of interest. In the embodiment disclosed, the measurements produced are dependent upon magnetic and electrical properties of the formations and are representative of magnetic susceptibility and electrical conductivity sensed at a plurality of positions in the borehole at each depth and derived from magnetic field measurements obtained in the borehole.

The system of the present invention comprises three magnetic field generating and sensing coils coupled to a borehole tool at three angular positions displaced from the longitudinal axis of the tool and spaced apart about 120° around the axis. Support means is provided for supporting each coil radially outward from the borehole tool in a position whereby the axis of each coil is substantially parallel to a line tangent to the perimeter of the wall of the borehole. The support means includes means for urging each of the coils against the wall of the borehole.

Means is provided for actuating the three coils for generating three independent varying magnetic fields at three spaced apart angular regions, respectively, for application to the formations. The three coils each produce an output which changes in accordance with changes in the magnetic and electrical properties of the formations as the tool is moved through the borehole. Means produces from each output a pair of first and second signals whereby three pairs of first and second signals are produced. The first signals of each pair are indicative of the electrical properties of the formations, while the second signals of each pair are indicative of the magnetic properties of the formations. These three pairs of signals are recorded by recording means in correlation with depth.

The present invention has advantages in that it may be used in any type of casing-free borehole, whether the borehole contains, for example, air or gas, a conductive fluid, or an oil-base nonconductive fluid. In addition, by deriving from each coil output both magnetic susceptibility and electrical conductivity measurements, two significant parameters are measured, each independent of the other. Independent measurements of this nature are desired since they enchance the dipmeter operations. For example, some beds may show no appreciable changes in electrical conductivity but do show changes in magnetic susceptibility or vice versa. Thus, by measuring both parameters, assurance is provided of obtaining dip information in more types of formations.

For further objects and advantages of the present invention and for a more complete understanding thereof, reference may now be had to the following detailed description taken in conjunction with the accompanying drawings wherein:

FIGURE 1 illustrates a borehole system for carrying out the invention; and

FIGURE 2 illustrates in block diagram the circuitry of the system of FIGURE 1.

Referring to FIGURE 1, the borehole dipmeter system comprises a borehole tool 10 having coupled thereto three spaced apart sensors 11–13 for measuring the apparent vertical displacement of the boundary between strata at a plurality of points around the borehole for determining dip. The sensors are spaced 120° apart and are supported in a given plane perpendicular to the axis of the tool 10 by spring-biased supports 14–16. The supports position the sensors radially outward from the tool against the borehole wall. Spring members 17 and 18 spaced from the sensors centralize the tool in the borehole.

The three sensors 11, 12, 13, including other instrumentation not shown in FIGURE 1, are employed to obtain two types of measurements representative of two independent parameters. These measurements are applied to recording system 19 where there are recorded in correlation with depth three sets of continuous traces 20–21, 22–23, and 24–25. Traces 20, 22, and 24 are representative of one parameter sensed by each sensing system, while traces 21, 23, and 25 are representative of the other parameter sensed. Dip is determined by observing the displacement with respect to depth of the excursions of the three sets of traces.

The sensors of the present system are magnetic field sensors and are employed to obtain measurements of magnetic and electrical properties of the formations and more particularly of magnetic susceptibility (K) and electrical conductivity ($\sigma$), from varying composite magnetic fields created in the formations. In this respect, there is created in the formations a primary magnetic field and a secondary field 90° out of phase from the primary field and generated by eddy currents induced by the primary field. The primary field is influenced predominantly by the magnetic susceptibility of the formations while the secondary field is indicative of formation electrical conductivity. The resultant composite fields are sensed at three spaced apart regions in the borehole by the sensors 11–13. The output of each sensing system comprises a signal having two components spaced apart in time phase and proportional to magnetic susceptibility and electrical conductivity, respectively. Phase separation is carried out by phase sensitive systems, not shown in FIGURE 1, to separate the output of each sensing system into the separate signals proportional to magnetic susceptibility and electrical conductivity.

Referring to FIGURE 2, there will be described in more detail one system suitable for obtaining the desired magnetic susceptibility and electrical conductivity measurements employing magnetic field sensors. In this system, the instrumentation shown below the dotted line 40 is located in the borehole tool, while that shown above the dotted line is located at the surface. In the embodiment shown, each sensor 11–13 comprises a coil 41–43, respectively, excited by an oscillator system for the production of varying magnetic fields at three spaced apart regions. Contrast in magnetic susceptibility produces contrast in the reluctance in the external path to the field produced directly by each coil and thus changes the inductance of the coil by an amount proportional to the magnetic susceptibility of the surrounding formations. This inductance change primarily is a reactance component and gives rise to a change primarily in the quadrature component of the impedance of the coil system. In addition to the magnetic susceptibility sensitivity, each coil is sensitive to electrical conductivity changes since the secondary magnetic field generated by the eddy currents primarily changes the resistance of the coil.

Each coil is connected as one arm of a balanced bridge which in turn is coupled to a phase-sensitive system. Separate bridge and phase-sensitive systems for each coil are illustrated in block form at 45–47, system 47 being shown in detail. Variations in the electrical impedance of each coil as it passes through varying formations unbalances its bridge to produce at the bridge output a signal made up of two components spaced 90° in time phase and proportional to magnetic susceptibility and electrical conductivity. The total bridge unbalance reflected by the signal output is separated into its conductive and reactive components by the phase-sensitive system so that the electrical conductivity and magnetic susceptibility of the formations are recorded independently and simultaneously.

A brief description now will be given of the bridge and phase-sensitive system 47 coupled to coil 43. Systems 45 and 46 are similar in structure. A more complete description of such a system may be found in U.S. patent No. 2,625,583. As shown in FIGURE 2, a 10,000-cycle per second oscillator 50 and a 1,000-cycle per second oscillator 51 are employed for energizing coil 43. The high and low frequency oscillators are employed, respectively, to increase the sensitivity of the coil to changes in electrical conductivity and magnetic susceptibility, respectively. Exciting current is applied to the coil 43 from the oscillators by way of bridge 52, which may comprise a Wheatstone bridge. Prior to logging, the bridge 52 is balanced by suitable calibration During logging, the bridge unbalance signal is separated into its two components proportional to magnetic susceptibility and electrical conductivity by application to phase-sensitive detectors 53 and 54, respectively. The bridge unbalance signal is applied to phase detector 53 by way of amplifier 55 and filter 56, predominantly responsive to 1,000-cycle per second signals. The bridge unbalance signal also is applied from amplifier 55 to phase detector 54 by way of filter 57, predominantly responsive to 10,000-cycle per second signals. Reference signals from oscillator 51 are applied to phase detector 53 by way of phase-shifting system 58. This system is adjusted until the output thereof applied to phase detector 53 is in phase with the quadrature component of the bridge unbalance signal applied by way of 1,000-cycle per second filter 56. The quadrature component of the 1,000-cycle per second voltage of the bridge varies with the magnetic susceptibility of the earth. Thus, the output of the phase detector 53 is a signal dependent upon the magnetic properties of the formations and has a magnitude proportional to magnetic susceptibility. This signal is frequency modulated and transmitted to the surface to the uphole recording system.

Reference signals from oscillator 50 are applied by way of phase-shifting system 59 to phase detector 54 to separate the in-phase unbalance bridge signal component. Separation is carried out by adjusting system 59 until the output applied to the phase detector 54 is in phase with the in-phase component of the bridge unbalance signal applied by way of the 10,000-cycle per second filter 57. The output of phase detector 54 thus is a signal dependent upon the electrical properties of the formations and has a magnitude proportional to conductivity or inversely proportional to resistivity. This signal is frequency modulated and transmitted to the surface to the uphole recording system. Bridge and phase-sensitive systems 45 and 46 operate in a similar manner to separate the in-phase and out-of-phase signals proportional, respectively, to electrical conductivity and magnetic susceptibility sensed by the coils 41 and 42.

As mentioned previously, prior to logging, the systems 45–47 are balanced and calibrated to obtain the desired measurements during logging. For example, with the borehole tool suspended in air, the Wheatstone bridges of systems 45–47 are adjusted for minimum output for both the high frequency and low frequency voltages applied thereto from the high and low frequency oscillators of each system, respectively. Systems 45–47 are adjusted for quadrature and in-phase measurements by suitably adjusting the phase-shifting circuits of each system with the detector coil of each system placed separately in a resistive environment and then in a reactive environment as can be understood by reference to the above-mentioned patent.

Transmission of the susceptibility and conductivity outputs of each bridge and phase-sensitive systems 45–47 to the surface is carried out by a multiplexing arrangement. As shown, the six outputs of the systems 45–47 are applied to voltage controlled oscillators 60–65, each of which produces a frequency proportional to the voltage applied thereto. The oscillators are adjusted each to operate within spaced apart narrow bands or channels. For example, the center frequency of oscillators 60–65 may be, respectively, 500, 550, 600, 650, 700, and 750 cycles per second. Each band width is narrow enough to prevent overlap. The outputs of the oscillators are applied to a summing and impedance matching network 66, the output of which is coupled to cable conductor 67 for transmission to the surface. At the surface, the cable conductor is coupled to sharply tuned filters 70A–75A responsive to the band widths of oscillators 60–65, respectively. Thus, separation of the six frequency signals is obtained. The output of each uphole filter is applied to a discriminator 70B–75B which converts the frequency signal to a voltage having a magnitude proportional to frequency. The voltage of each discriminator is applied to the recording system 19 for the production of the six continuous traces.

As shown in FIGURE 1, the borehole tool is passed through the borehole by way of cable 80 wound and unwound upon a drum 81 driven by motor 82 and connection 83. The signals from the cable conductor are applied to the surface instrumentation by way of a slip ring and brush illustrated at 84 and 85. The chart of the recording system is driven in correlation with depth by measuring reel 86 and connection 87. The recording system 19 may comprise one multitrace recorder for recording the six logs of the present invention and auxiliary logs or a magnetic tape recorder for use with computers.

In the system of FIGURE 2, coils 41–43 have cores 91–93, respectively, of high permeability material to increase the magnetic flux flowing through the coils thereby increasing the sensitivity to external changes. The coils employed are relatively small, for example, having a length of about three inches and a diameter of about one-half inch, whereby the fields produced for each coil do not affect the fields produced by the other coils. In addition, the coils are positioned such that their axes are tangent to a circle perpendicular to the axis of the borehole tool.

Each detector coil is encased in a suitable casing for protective purposes. The coil casing is formed of nonmagnetic and nonconductive material. Similarly, the body structure of the tool 10, including support arms 14–16, are formed of nonmagnetic and nonconductive material.

In the embodiment described above, each sensing system for obtaining the desired measurements comprised a single coil forming one arm of a bridge which acted as a magnetic field source and detector. It is to be understood that other magnetic field sensing systems may be employed. For example, a separate source coil system actuated by an oscillator arrangement may be employed to generate the varying magnetic field. Spaced from the source coil system may be separate magnetic field sensors for sensing the resulting magnetic fields. The output of these sensors may then be phase separated to measure magnetic susceptibility and electrical conductivity. In such a system at least three spaced apart sensors may be employed to obtain three sets of magnetic susceptibility and electrical conductivity traces for determining dip.

Although not shown, it will be understood that the dip-meter system will also employ means for measuring borehole diameter, inclination of the tool from vertical, direction of inclination with respect to north, and direction of one of the three detectors. Systems for carrying out these measurements are well known to those skilled in the art.

The voltage-controlled oscillators and discriminators employed may be obtained commercially, for example, from Teledynamics Division, American Dofpharma Corp., Philadelphia, Pa.

Now that the invention has been described, modifications will become apparent to those skilled in the art and it is intended to cover such modifications as fall within the scope of the appended claims.

What is claimed is:
1. A borehole dip meter system comprising:
an elongated borehole tool adapted to be inserted into a borehole traversing formations of interest,
means for moving said borehole tool through said borehole,
three magnetic field generating and sensing coils coupled to said borehole tool at three angular positions displaced from the longitudinal axis of said tool and spaced apart about 120° around said axis,
support means for supporting each of said coils radially outward from said borehole tool in a position whereby the axis of each of said coils is substantially parallel to a line tangent to the perimeter of the wall of said borehole,
said support means including means for urging each of said coils against the wall of said borehole,
means for actuating said three coils for generating three independent varying magnetic fields at three spaced apart angular regions, respectively, for application to said formations,
said three coils each producing an output which changes in accordance with changes in the magnetic and electrical properties of said formations as said tool is moved through said borehole,
means for producing from each output a pair of first and second signals whereby three pairs of first and second signals are produced,
said first signals of each pair being indicative of the electrical properties of said formations,
said second signals of each pair being indicative of the magnetic properties of said formations, and
means for recording said three pairs of said first and second signals in correlation with depth.

References Cited

UNITED STATES PATENTS

| | | | |
|---|---|---|---|
| 2,176,169 | 10/1939 | Doll | 324—10 X |
| 2,427,950 | 9/1947 | Doll | 324—10 |
| 2,428,155 | 9/1947 | Guyod | 324—6 |
| 2,719,948 | 10/1955 | Zimmerman | 324—5 |
| 2,770,773 | 11/1956 | Cooley | 324—8 X |
| 2,963,641 | 12/1960 | Nanz | 324—13 |
| 3,068,400 | 12/1962 | Castel et al. | 324—1 |
| 3,187,252 | 6/1965 | Hungerford | 324—6 |

RUDOLPH V. ROLINEC, *Primary Examiner.*

G. R. STRECKER, *Assistant Examiner.*